United States Patent

Baker

[15] 3,644,905

[45] Feb. 22, 1972

[54] SINGLE DEVICE STORAGE CELL FOR READ-WRITE MEMORY UTILIZING COMPLEMENTARY FIELD-EFFECT TRANSISTORS

[72] Inventor: Lamar T. Baker, West Islip, L.I., N.Y.

[73] Assignee: General Instrument Corporation, Newark, N.J.

[22] Filed: Nov. 12, 1969

[21] Appl. No.: 875,968

[52] U.S. Cl.........................340/173 FF, 307/238, 307/279, 340/173 R

[51] Int. Cl....................................G11c 11/40, H03k 3/286

[58] Field of Search......................307/238, 279; 340/173 FF

[56] References Cited

UNITED STATES PATENTS 3,387,286 6/1968 Dennard..............................340/173

3,518,635 6/1970 Cole....................................340/173

*Primary Examiner*—Terrell W. Fears

*Attorney*—James & Franklin

[57] ABSTRACT

A memory cell for a random-access memory comprises a data storage element at which data is stored at one of two discrete levels. When the memory cell is addressed, a signal corresponding to the stored data signal is developed and is compared to a reference signal at a comparator, thereby to produce an output data signal. The comparator may be formed of two field-effect transistors respectively receiving the data and reference signals at their gates. The sources of these transistors may be connected to the substrate to ensure minimum threshold voltages for these devices.

13 Claims, 2 Drawing Figures

Figures 1, 2:
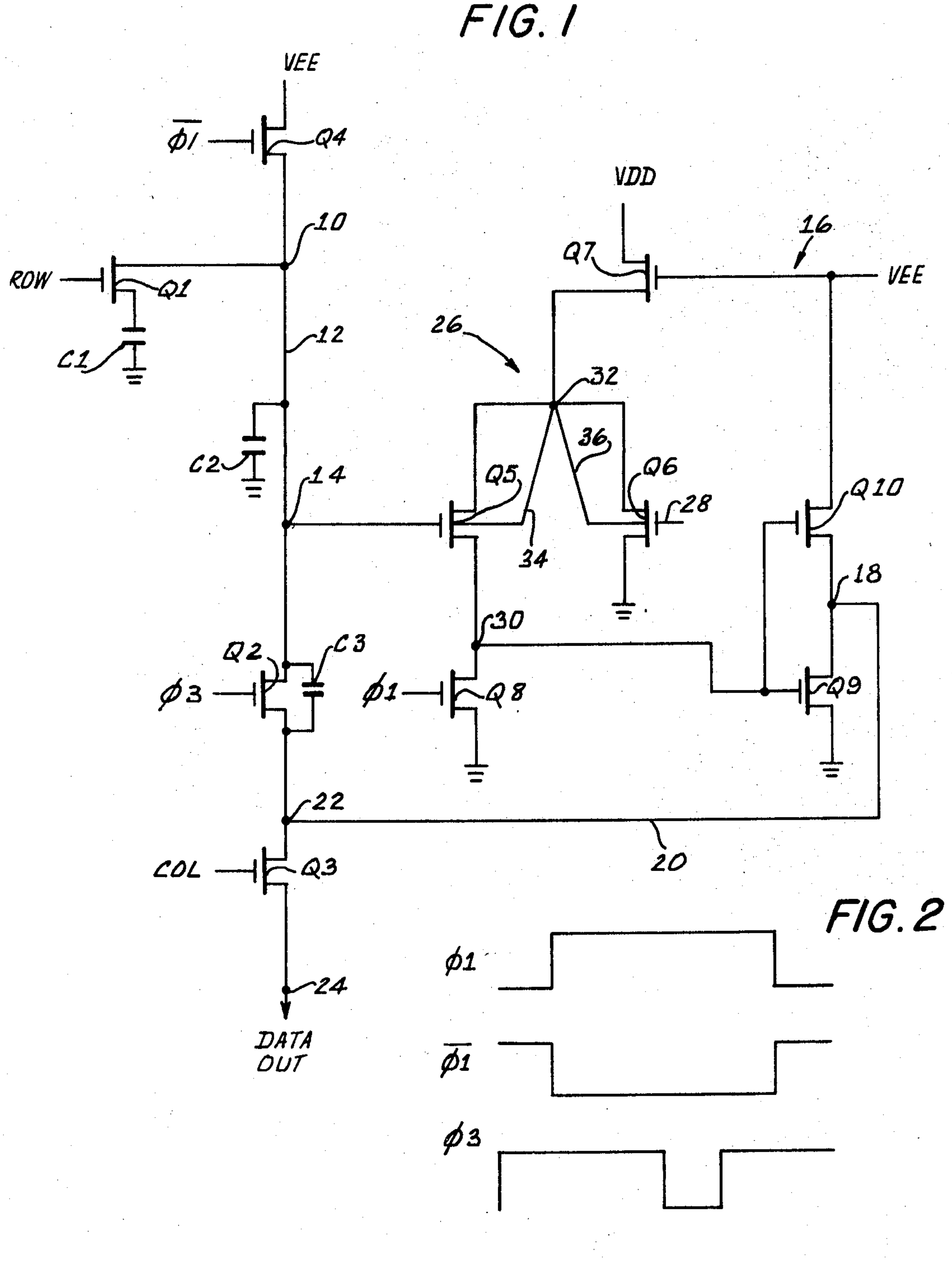

INVENTOR
LAMAR T. BAKER
BY
Sandoe, Hopgood & Calimafde
ATTORNEYS

SINGLE DEVICE STORAGE CELL FOR READ-WRITE MEMORY UTILIZING COMPLEMENTARY FIELD-EFFECT TRANSISTORS

The present invention relates generally to memories, and particularly to a single device memory unit for use in a random-access memory.

One of the more significant new developments in the art of memory design is the use of large scale integration (LSI) techniques. In memories fabricated along these lines, the data storage and control devices are defined by field-effect transistors (FET's). Memories of this type are characterized by their speed of operation, low current drain, and the large number of information bits that can be stored in a relatively compact volume.

In one particularly successful memory design of this type, the data is stored on a storage device such as a capacitor which is operatively connected to the normally nonconducting output circuit of a single FET.

The gate of that FET receives an address select signal and, when actuated thereby, transfers the stored data signal to a data node. That transferred data signal at the data node is then sensed to produce an output data signal corresponding to the stored data signal.

To achieve the desired speed and accuracy of memory operation, the sensing circuitry must be able to respond accurately to relatively slight variations in the signal level at the data node. In a typical memory of the type described, the signal level at the data node may vary in the order of only 2–3 volts between a stored logic "1" and a logic "0" signal. To ensure that the memory consistently produces a correct output signal, the switching devices in the sensing circuitry must be responsive to only one of the data node levels, and not to the other.

With this in mind, there is a factor present in the design of integrated circuit memories of this type which must be considered. LSI circuits are typically fabricated by selectively forming channels of a given conductivity type on a semiconductor substrate, usually of an opposite conductivity type. A field-effect transistor comprises source and drain regions of a given conductivity type, and a gate region of the opposite conductivity type provided between the source and drain regions. By applying a suitable potential to the gate region, conduction is caused between the source and drain regions.

The gate-to-source potential required to cause source-drain conduction is defined as the threshold voltage for the device. This threshold voltage commonly varies between different semiconductor wafers or chips on which the FETS are formed, and may also vary on a single chip as the chip ages. The variations in the threshold value affect the switching operation of the various FET's formed on the chip by varying the level of the gate signal required to render the FET conductive.

Several designs have been proposed in integrated circuit memories, to compensate for threshold variations. While these are somewhat successful toward achieving their desired result, their inclusion in FET memories significantly increases the complexity and current drain of the memory and reduces the space on the chip available for data storage.

To ensure proper operation of a memory formed from a plurality of such devices on a single semiconductor chip with the relatively small differential data signals utilized in the operation of the memory, a minimum threshold voltage for the switching FET's controlled by the data signals is generally called for. However, when a reverse bias condition exists between the source and the semiconductor substrate on which the FET is formed, there is an increase in the threshold voltage for that device. It is often difficult in the design of FET's to avoid such a reverse-bias condition, and as a result the threshold voltages for the devices on that chip unavoidably increase. As a result greater variations of the data signals applied to the switching FET's are required to ensure reliable operation of the memory. This large signal variation is often not readily achieved in single-device memory cells, and even when obtainable, causes a reduction in the speed at which data can be read out from the memory.

It is, therefore, a general object of the present invention to provide an improved single device data storage cell for use in a random-access memory.

It is a further object of the present invention to provide a high-speed memory cell which is substantially insensitive to variations in threshold voltage.

It is another object of the present invention to provide a memory cell of the type described in which accurate and high-speed operation is ensured over long periods of memory operation without adverse changes in memory performance.

It is yet another object of the present invention to provide a random-access memory cell of the type described which can be fabricated in large quantities on a great number of semiconductor chips, without considering the possible effect of threshold variation which may occur in the various chips.

It is still a further object of the present invention to provide a random-access memory cell in which additional compensating circuitry for variations in the threshold voltage is not required to ensure reliable memory operation.

It is yet another object of the present invention to provide a single device memory cell of the type described in which a minimum threshold voltage for at least the critical switching devices in the cell is ensured.

To these ends, the present invention provides a memory cell for a random-access memory comprising a data storage element on which data is stored at one of two discrete levels. When the unit is addressed, a corresponding signal is developed, which signal is compared to a reference signal at a comparator, thereby producing an output data signal corresponding to the stored data signal. The sections of the comparator each comprise a field-effect transistor formed on a common semiconductor chip and respectively receiving the data and reference signals at their gates. Since the threshold voltage for each FET in the comparator is of necessity the same, operation of the comparator is independent of variations in the threshold voltage.

Field-effect transistors are most commonly formed of the P-channel type, in which the source and drain regions are formed of P-type material. Source-to-drain conduction is effected when a negative voltage is applied to the gate region with respect to the source by an amount exceeding the threshold voltage of the FET. In contrast, N-channel FET's comprise N-type source and drain regions. For these devices, conduction between the source and drain regions is effected by the application of a sufficiently high positive voltage to the gate.

In the embodiment of the memory cell herein described, the comparator FET's are of the N-channel type, and the memory circuit further includes complementary switching FET's of both N- and P-types for achieving its desired improved operating characteristics. To ensure a minimum threshold voltage for the comparator FET's, their sources are both connected to the substrate in which they are formed, thereby to prevent a reverse bias condition from occuring between the source and substrate of these devices.

To the accomplishment of the above and to such further objects as may hereinafter appear, the present invention relates to a single device storage cell for a read-write, random-access memory as defined in the appended claims and as described in the following specification, taken in conjunction with the accompanying drawings, in which:

FIG. 1 is a schematic diagram of a single device storage cell for a read-write memory in accord with the present invention; and FIG. 2 is a waveform diagram of the clock pulses utilized in the operation of the memory cell of FIG. 1.

In the circuit of FIG. 1, a data cell for a single address station in a read-write, random-access memory is shown. That address station, as is conventional, may be defined at the intersection of a single row and a single column in the memory. The data signal is stored on a capacitor C1 at one of two levels corresponding respectively to the logic "1" and the logic "0" conditions. Capacitor C1 is connected between the drain of a P-channel FET Q1, which receives the row select signal (u-niquely negative for the addressed row) at its gate. The source of FET Q1 is connected at a point 10 to a column line 12. An equivalent line capacitance C2 is connected between line 12 and ground between point 10 and a data node 14 on line 12. Node 14 defines an input point to a comparator-amplifier refresh circuit generally designated 16 which has an output node 18, which in turn is connected by a line 20 to point 22.

A P-channel FET Q2 has its source-drain output circuit connected between node 14 and point 22 and receives the 03 clock phase (FIG. 2) at its gate. If desired, a capacitor C3 may be connected across the output circuit of FET Q2 and is thus effectively connected between nodes 14 and 18, the input and output points respectively of circuit 16.

A P-channel FET Q3 has its output circuit connected between point 22 and a data output node 24 and receives the column select signal (uniquely negative for the addressed column) at its gate. Point 10 is precharged negative during 01 time (when $\overline{0}1$ is positive) through the output circuit of an N-channel FET Q4, the source of which is connected to the negative VEE supply.

In operation, the presence of a negative row select signal at the gate of FET Q1 renders that device conductive and causes a signal to be developed at node 14 due to the voltage division provided by the capacitive voltage divider defined by capacitors C1 and C2. That signal, which is thus representative of the signal level stored at capacitor C1, is reflected, in a manner to be described below, at node 18 and point 22, and is transferred through the output circuit of FET Q3 for the addressed column to output node 24. During 03 time, i.e., when the 03 clock phase (FIG. 2) is negative, FET Q2 conducts and reapplies the logic signal through the output circuit of FET Q1 to capacitor C1, thereby to refresh or restore the data signal thereat. The feedback between nodes 18 and 14 provided by capacitor C3 increases the rate at which data restoring is performed.

Circuit 16 comprises a signal comparator 26, which in turn comprises a pair of substantially identical N-channel FET's Q5 and Q6. The gate of FET Q5 is connected to node 14 and the gate of FET Q6 is connected to a reference signal source 28. Comparator 26 compares the data signal and the reference signal to provide, from that comparison, a signal at node 18 representative of the stored data signal at capacitor C1.

The source terminals of FET's Q5 and Q6 are connected to the drain of an N-channel current source FET Q7 in a manner more completely described below. The source of FET Q7 is connected to the negative VDD supply and its gate is connected to the negative VEE supply. The level of the former is greater than that of the latter; in a typical memory, VDD is −17 v. and VEE is −12 v.

The drain of FET Q5 is connected to the drain of a P-channel FET Q8 at a junction point 30. The gate of FET Q8 receives the 01 clock phase and its source is connected to ground. The drain of FET Q6 is also connected to ground. Point 30 is connected to the gate of a P-channel FET Q9 and to the gate of an N-channel FET Q10. The source of FET Q9 is connected to ground and its drain is connected to the drain of FET Q10 at node 18. The source of FET Q10 is connected to the VEE supply.

In operation, point 10 and node 14 are precharged negative during 01 time through the output circuit of FET Q4, and point 30 is charged to ground at this time through the output circuit of FET Q8. Since the source of FET Q7 is more negative than its gate, FET Q7 is always conductive and provides a constant supply of current to the sources of FET's Q5 and Q6 in comparator 26.

Comparator 26 compares the signal level at node 14 and at the gate of FET Q5, and the level of the reference signal at source 28 at the gate of FET Q6. For a stored logic "1" signal, the former is more negative than the latter, and the signal at the gate of FET Q6 is thus more positive than the signal at the gate of FET Q5. As a result, substantially all the current supplied by FET Q7 is passed through the output circuit of FET Q6 to ground, and point 30 remains at ground potential. FET Q9 is thus nonconductive, FET Q10 is conductive, and node 18 is charged negative to the Vee level. That negative signal constitutes the data readout and refresh signal for a stored negative (logic "1") signal at capacitor C1 as desired.

Conversely, for a stored logic "0" signal at capacitor C1, the resultant voltage distribution will cause the level at node 14 to be less negative than the reference signal, and FET Q5 will be conductive, thereby bypassing substantially all the current from current source FET Q7 and causing point 30 to be charged negative.

When this occurs, FET Q9 is turned on, FET Q10 is rendered nonconductive, and node 18 is connected to ground. This produces a ground or logic "0" signal at node 18 which is transferred to the output node 24 and, during 03 time, to data-storing capacitor C1. It will be appreciated that since both FET's Q5 and Q6 are formed on the same semiconductor substrate, their threshold voltages must of necessity be the same. As a result, any variations in the threshold voltage will not affect the balance of the two sections (FET's Q5 and Q6) of comparator 26.

As the difference between the signals resulting from the voltage division at node 14 for a logic "1" and logic "0" signal stored at capacitor C1 is relatively small, e.g., in the range of between 2 and 3 volts, comparator 26 must be sensitive to these variations to cause either FET Q5 or FET Q6 to be properly conductive in accord with the stored logic signal.

For example, in a typical memory designed in accordance with that shown in FIG. 1, a logic "1" signal is represented by between −5 and −10 volts on capacitor C1, and a logic "0" signal by 0 to −4 volts. The value of capacitor C2 is in the range of 2.0 pf., while that of capacitor C1 is in the range of 0.7 pf. The signal level developed at node 14 is thus about −9 v. for a stored logic "0" signal and −11.5 v. for a stored logic "1" signal. These are the signals that are compared to the reference signal from source 28, which may be set to about −10 v.

It is thus essential that the threshold voltages of both FET's Q5 and Q6 be at a minimum to ensure proper operation of comparator 26 for the two possible input conditions at node 14. In the memory of the present invention, this is achieved by preventing the occurrence of a reverse-bias condition between the sources of FET's Q5 and Q6 and the substrate on which these FET's are formed.

To this end, in the fabrication of circuit 16, a pair of P-type semiconductor wells or regions is formed in an N-type semiconductor substrate. The P-regions for forming the various P-channel FET's are all formed in the N-type substrate. In a first of these P-type wells, the two N-regions defining the source and drain of FET Q7 are formed, and in another of these wells are formed the N-type sources and drains of FET's Q5 and Q6. The sources of FET's Q5 and Q6 as well as the drain of FET Q7 are preferably all electrically connected at a point 32 to the P-type substrate as indicated by the lines 34 and 36. This source-to-substrate connection of the two component FET's Q5 and Q6 of comparator 25 ensures that there will be no reverse-bias developed between the sources of FET's Q5 and Q6 and the substrate, even if the substrate is connected to the VDD supply. This in turn ensures that the threshold voltage of these FET's is maintained at a minimum level, thereby to ensure the desired maximum sensitivity of the comparator 26 to the relatively slight variations in the data signal level developed at node 14 during a data readout operation.

The memory cell of the present invention thus satisfies the objects set forth above in that it provides high-speed and reliable memory readout and data restoration in a manner which is substantially independent of threshold variations between memory chips, or on a single chip over a period of time. The memory of this invention is thus particularly well suited for fabrication in large quantities. As no threshold variation compensation is required, the memory circuitry is not complex, and greater data-storing capacity is provided in a given volume of semiconductor chip material. Moreover, by the connection of the sources of the comparator FET's to the substrate, an optimum, minimum threshold voltage for these devices is ensured.

As herein shown, the FET's Q5 and Q6 used in the data comparator 26 are of the complementary or N-channel type. This provides optimum operation for the negative signals developed at node 14 during a readout operation of either a logic "1" or logic "0" signal. In the event that a positive signal were stored on capacitor C1 for a logic "1", it would then be advisable to utilize P-channel FET's in the two sections of comparator 26.

Thus, while only a single embodiment of the present invention has been herein specifically disclosed, it will be apparent that variations may be made therein without departure from the spirit and scope of the invention.

I claim:

1. A data-storing cell for use in a memory comprising data storage means for storing data signals at one of two discrete logic levels, a data node, means for selectively establishing a signal at said data node corresponding to the level stored at said storage means, a source of a reference signal, and means for comparing the signal level at said data node and said reference signal and to produce from that comparison an output signal corresponding to the signal at said storage means, further comprising a semiconductor substrate, said comparing means comprising first and second semiconductor switch means formed on said substrate and each having an output terminal operatively electrically connected to said substrate, said first and second switch means each comprising a control terminal, and further comprising means operatively connecting said data node to the control terminal of said first switch means, and means operatively connecting the control terminal of said second switch means to said reference signal source.

2. The unit of claim 1, in which said first and second switch means comprise first and second field-effect transistors of a first conductivity type, said substrate being of an opposite conductivity type, said substrate-connected terminals of said first and second field-effect transistors being their source terminals.

3. The unit of claim 12, further comprising means for supplying current to said comparing means, said current-supplying means comprising a third field-effect transistor of said first conductivity type, and comprising means for biasing said third field-effect transistor into conduction.

4. The unit of claim 1, further comprising means for supplying current to said comparing means.

5. The unit of claim 1, further comprising an output node, and third switch means operatively connected between said first switch means and said output node.

6. The unit of claim 4, in which said current-supplying means comprises semiconductor means having a terminal operatively connected to said substrate and to one of the output terminals of said first and second switch means.

7. The unit of claim 5, further comprising an intermediate node operatively connected to the control terminal of said third switch means, and fourth switch means having an output terminal operatively connected to the output terminal of said first switch means and to said intermediate node.

8. The unit of claim 7, further comprising fifth switch means having a control terminal operatively connected to said intermediate node, and an output terminal operatively connected to said output node.

9. The unit of claim 8, in which said first and second switch means comprise first and second field-effect transistors of a first conductivity type, said substrate being of an opposite conductivity type, said substrate-connected terminals of said first and second field-effect transistors being their source terminals.

10. The unit of claim 9, further comprising means for supplying current to said comparing means, in which said current-supplying means comprises a third field-effect transistor of said first conductivity type, and comprising means for biasing said third field-effect transistor into conduction.

11. The unit of claim 10, in which said third and fourth switch means comprise fourth and fifth field-effect transistors of said opposite conductivity type, and said fifth switch means comprises a sixth field-effect transistor of said first conductivity type.

12. The unit of claim 13, in which said current supplying means comprises semiconductor means having a terminal operatively connected to said substrate and to one of the output terminals of said first and second switch means.

13. The unit of claim 1, further comprising an output node, and third switch means operatively connected between said first switch means and said output node, an intermediate node operatively connected to the control terminal of said third switch means, and fourth switch means having an output terminal operatively connected to the output terminal of said first switch means and to said intermediate node, fifth switch means having a control terminal operatively connected to said intermediate node, an output terminal operatively connected to said output node, said third and fourth switch means comprising fourth and fifth field-effect transistors of said opposite conductivity type, and said fifth switch means comprising a sixth field-effect transistor of said first conductivity type.

* * * * *